United States Patent
Black, III et al.

(10) Patent No.: US 6,407,526 B1
(45) Date of Patent: Jun. 18, 2002

(54) SAFETY SWITCHING SYSTEMS FOR PREVENTING SERIOUS MISALIGNMENT OF ADJUSTABLE CONTROL PEDALS IN AUTOMOTIVE VEHICLES

(75) Inventors: Charles E. Black, III; Daryn L. Waite, both of Mt. Prospect, IL (US)

(73) Assignee: Indak Manufacturing Corp., Northbrook, IL (US)

( * ) Notice: Subject to any disclaimer, the term of this patent is extended or adjusted under 35 U.S.C. 154(b) by 0 days.

(21) Appl. No.: 09/710,793

(22) Filed: Nov. 9, 2000

Related U.S. Application Data

(60) Provisional application No. 60/164,434, filed on Nov. 9, 1999.

(51) Int. Cl.[7] .............................................. H02P 7/56
(52) U.S. Cl. ...................... 318/551; 318/587; 310/75 B; 74/473.16; 74/473.17; 74/469; 74/481; 74/482; 74/512; 74/542; 74/560
(58) Field of Search ................................. 318/551, 587; 310/75 B; 74/473.16, 473.17, 469, 481, 482, 512, 542, 560

(56) References Cited

U.S. PATENT DOCUMENTS

| | | | | |
|---|---|---|---|---|
| 4,237,752 A | * | 12/1980 | Hildebrecht | 74/878 |
| 4,250,768 A | * | 2/1981 | Hildebrecht | 74/512 |
| 4,255,984 A | * | 3/1981 | Abels et al. | 74/474 |
| 5,214,360 A | * | 5/1993 | Gonser et al. | 318/551 |
| 5,969,495 A | * | 10/1999 | Cherry, Jr. et al. | 318/685 |
| 6,000,511 A | * | 12/1999 | Ebert et al. | 192/13 R |
| 6,223,865 B1 | * | 5/2001 | Lang et al. | 188/73.31 |
| 6,318,208 B1 | * | 11/2001 | Thongs, Jr. et al. | 74/513 |

\* cited by examiner

*Primary Examiner*—Robert E. Nappi
*Assistant Examiner*—Tyrone Smith
(74) *Attorney, Agent, or Firm*—Palamatier & Zummer; Francois N. Palamatier; Anthony S. Zummer

(57) ABSTRACT

Some automobiles have mechanisms for adjusting the height of accelerator and brake pedals, and any clutch pedal, so that drivers large and small can adjust the pedals to the best height. All pedals are adjusted by a single reversible electric motor having a shaft connected directly or by a flexible shaft to the adjusting mechanisms. If any fault develops in any mechanism, the pedals may not be adjusted to the same height, which is hazardous to the driver. A safety switching system detects any serious misalignment of the pedals and de-energizes the motor. The system comprises separate switches which are operable by adjustment of the pedals, and are electrically connected in series with the power supply circuit for the motor. When the pedals are aligned, the bridging contactors of the switches are aligned and are effective to maintain the electrical continuity of the motor circuit. Each contactor has three contact sliders which successively engage staggered tabs on contact strips for the respective pedals. Each contactor has a fourth slider for continuously engaging a separate common contact connected to the power supply circuit whereby the switches are in series therewith. If a fault develops in the drive for any pedal, the contactors of the switches become misaligned which interrupts the supply of electrical power to the motor and prevents adjustment of the pedals until the fault is corrected.

10 Claims, 8 Drawing Sheets

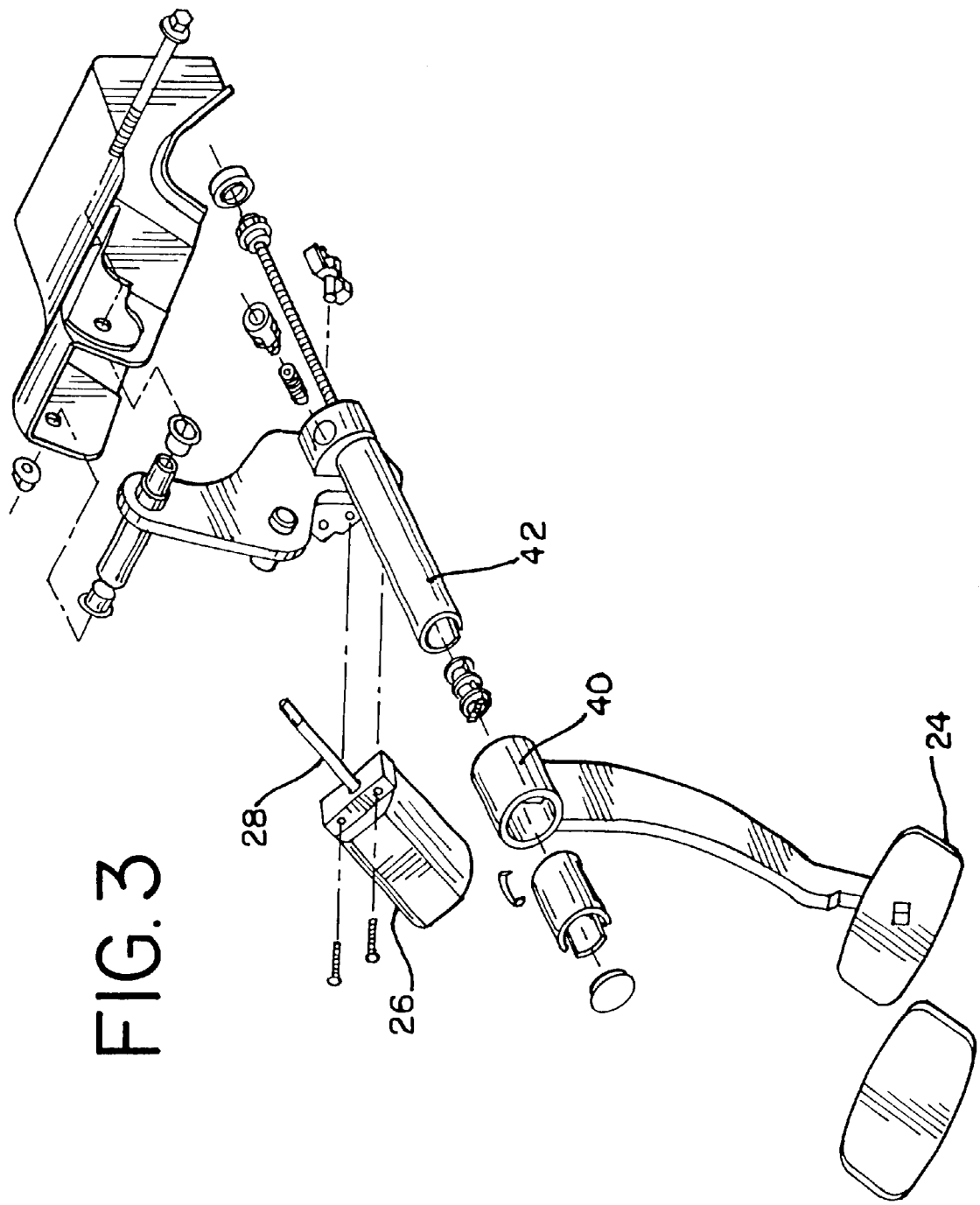

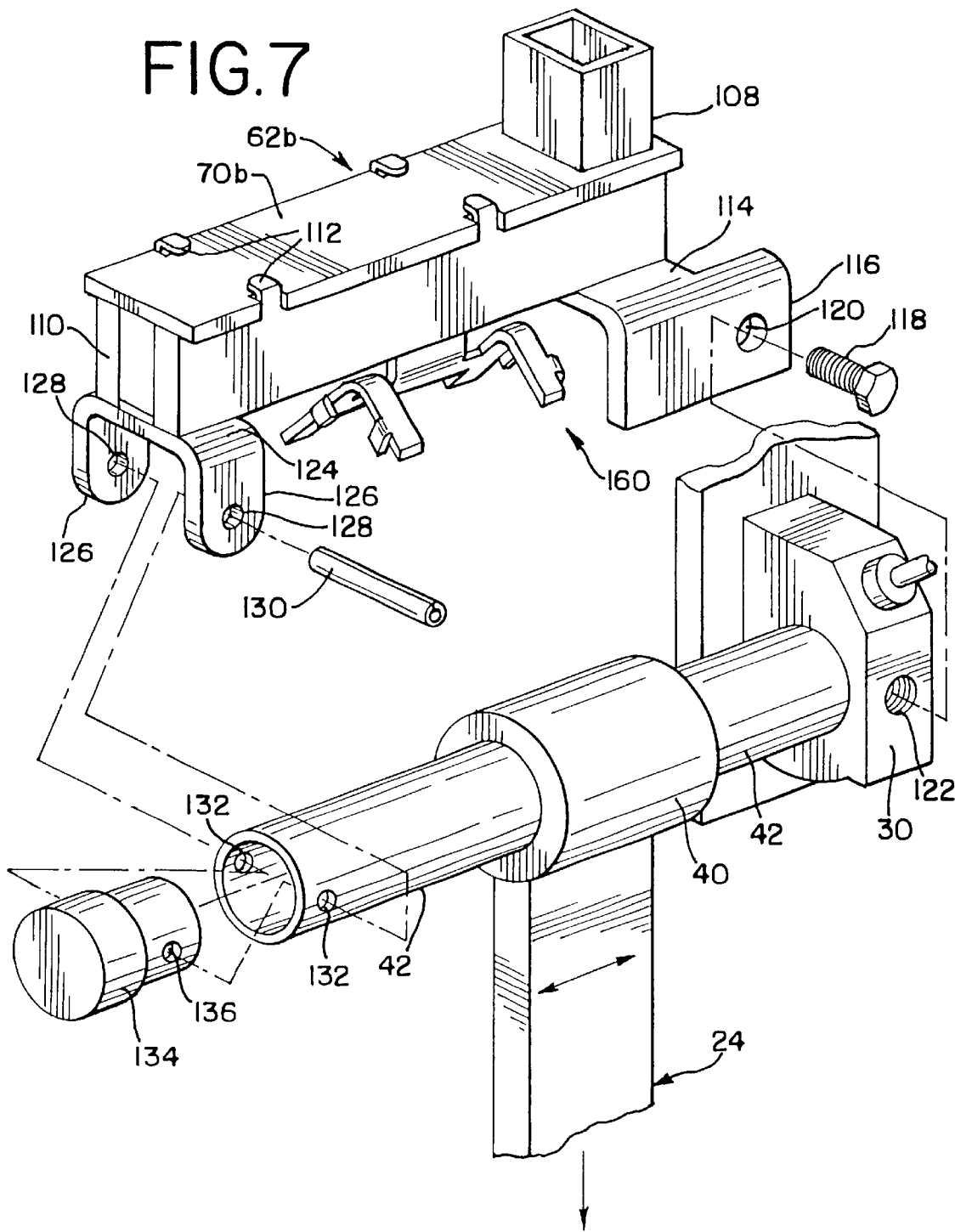

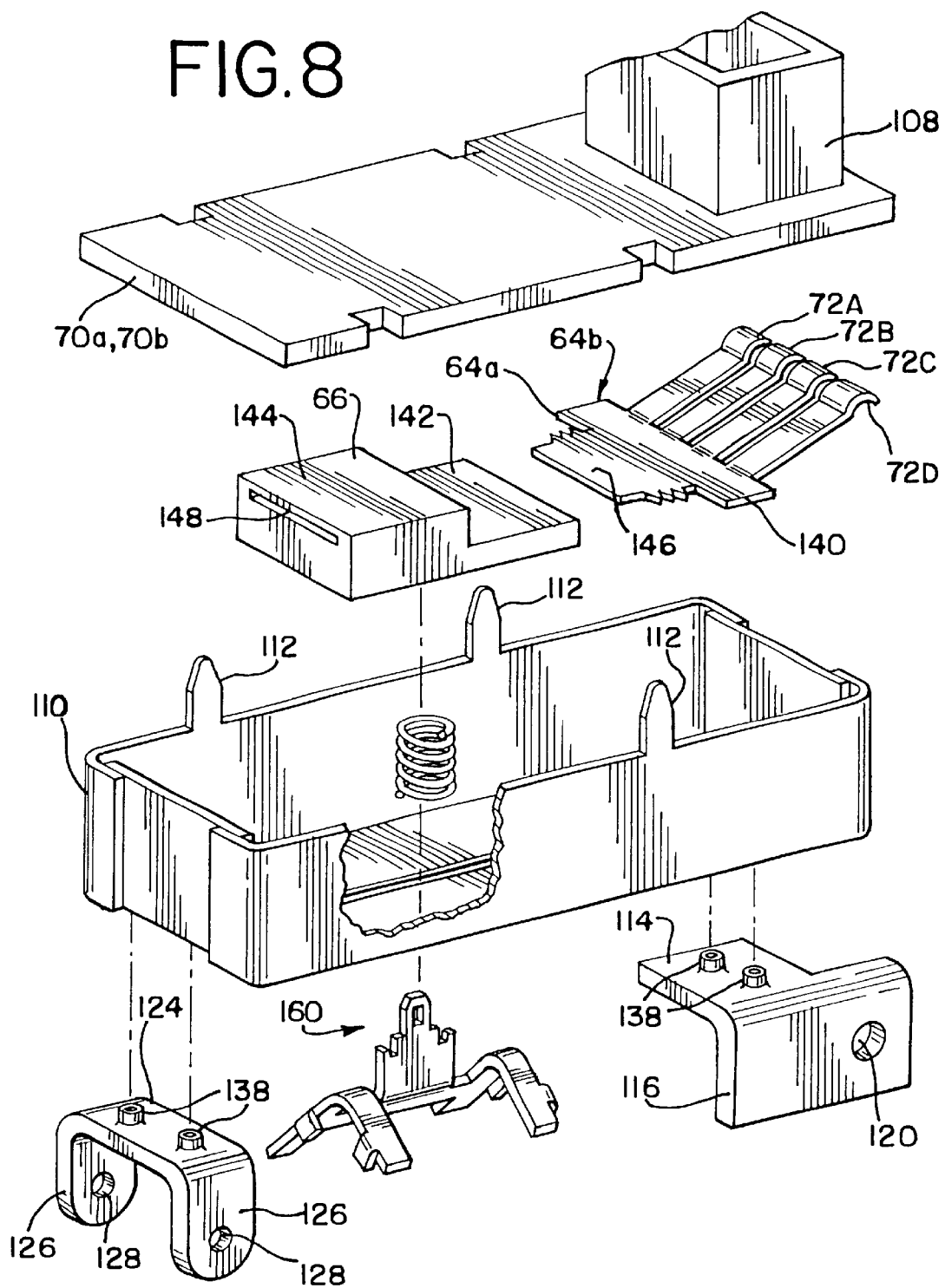

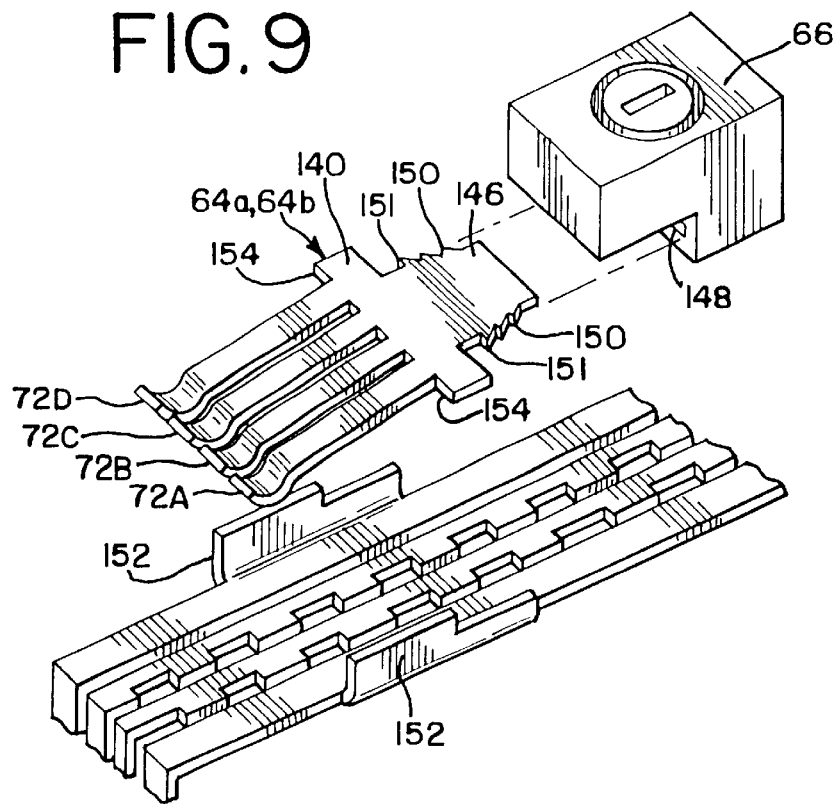
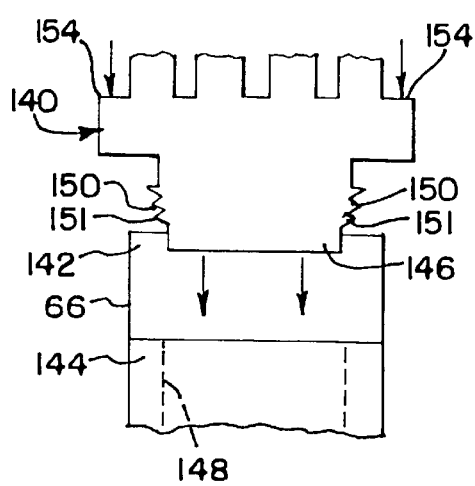
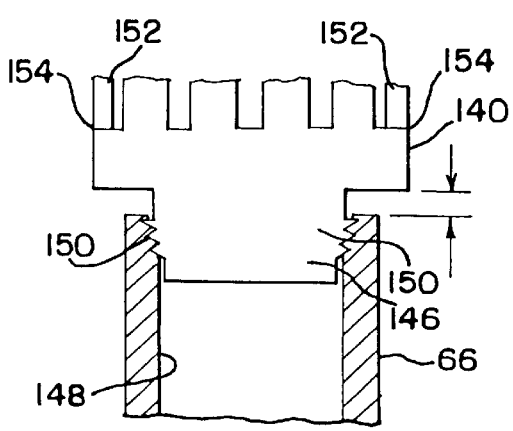

FIG.12
FIG.13
FIG.15
FIG.14
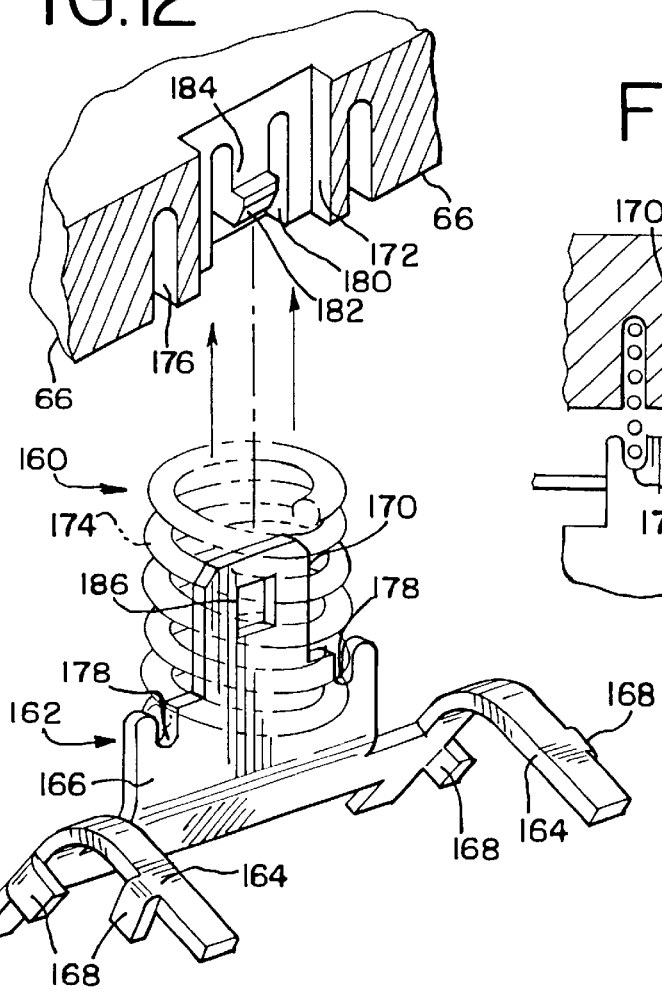
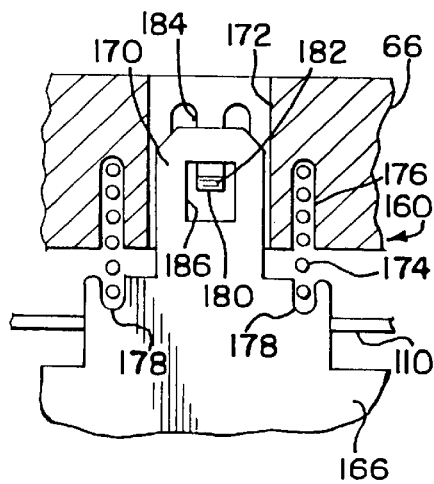
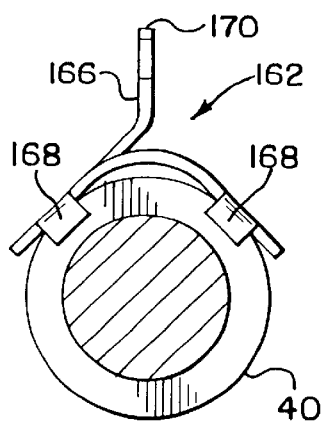
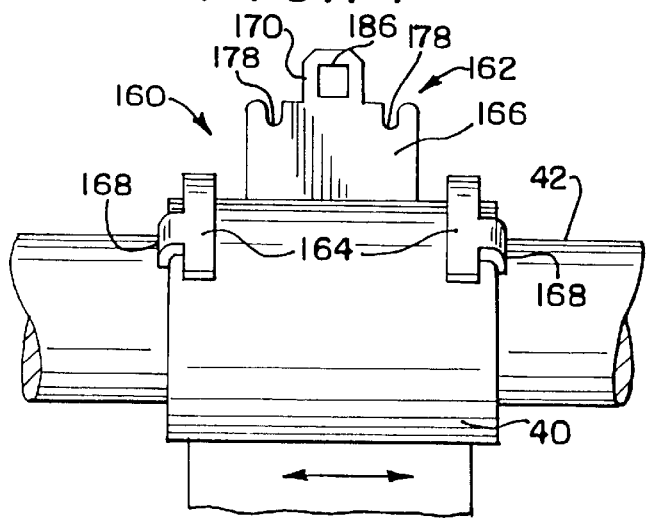

SAFETY SWITCHING SYSTEMS FOR PREVENTING SERIOUS MISALIGNMENT OF ADJUSTABLE CONTROL PEDALS IN AUTOMOTIVE VEHICLES

CLAIM OF PRIORITY OF PROVISIONAL PATENT APPLICATION

The applicants claim the priority and all other benefits of the U.S. PROVISIONAL PATENT APPLICATION NO. 60/164,434, filed Nov. 9, 1999.

FIELD OF THE INVENTION

This invention relates generally to power operated mechanisms for adjusting the positions of automotive control pedals, including brake, accelerator and clutch pedals, so that the pedals can be easily reached by both small and large drivers. More particularly, this invention relates to safety switching systems for preventing serious misalignment of the control pedals due to partial failure of the power operating mechanism.

BACKGROUND OF THE INVENTION

Virtually every new automotive vehicle is now equipped with an air bag mounted in the central portion of the steering wheel. The air bag is provided with means for deploying the air bag in response to rapid deceleration of the vehicle, such as the deceleration which occurs when the vehicle collides with another vehicle or an obstacle.

Recent findings on steering wheel air bag deployments have made it desirable for vehicle manufacturers to offer power pedal adjustment systems which can move the accelerator, brake, and if present, clutch pedals toward or away from the driver. This feature accommodates the needs of taller and shorter drivers while permitting them to be far enough away from the steering wheel to lessen the chance of injury to the driver by the air bag during deployment in an accident.

Current practice is to use a reversible motor mounted on a pedal assembly to slide the assembly toward and away from the driver. The motor rotates a long screw which drives a nut assembled to the pedal, so as to move the pedal in or out. To move the other pedal or pedals, a flexible rotary power cable is used to transmit the torque from the motor to the adjacent pedal or pedals. One possible problem which could occur is that the pedals would not all move together when the driver operates the motor switch, because of failure of the power cable, drive screw, or pedal nut. In this event an unsafe condition of severe pedal misalignment could result, wherein a driver might be able to reach the accelerator pedal easily, but be unable to adequately reach the brake pedal, or vice versa.

OBJECTS OF THE PRESENT INVENTION

One object of the present invention is to provide new and improved mechanical switches and safety switching systems incorporating such switches to prevent serious misalignment of the operating pedals of a vehicle.

Another object is to provide a new and improved switching system which includes slide or rotary type switches connected to and operable by the moveable pedals, together with a switching system for detecting the failure of any pedal to move normally when the other pedal or pedals are being moved by the drive motor, so that the failure of a pedal to move causes the corresponding switch to produce an open circuit, whereby the drive motor is deenergized, whereby the movement of all of the pedals is stopped.

A still further object of this invention is to provide new and improved switches for use in safety switching systems having two switches for two moveable pedals or three switches for three moveable pedals.

A further object is to provide new and improved switches of the foregoing character for preventing serious misalignment of the pedals which are constructed so as to be self adjusting by initial operation of the switching system and the motors in a prescribed manner.

Another object of the present invention is to provide a new and improved method of controlling a motor drive system for adjusting the positions of the control pedals in such a manner as to limit any possible misalignment of the pedals due to malfunctioning of the motor drive system.

A further object is to provide a new and improved method of the foregoing character by detecting any appreciable misalignment of the pedals and by disabling the motor drive system if any serious misalignment is detected.

BRIEF DESCRIPTION OF THE DRAWINGS

Further objects, advantages and features of the present invention will appear from the following detailed description, taken with the accompanying drawings, in which:

FIG. 3 is an exploded perspective view of a typical brake pedal employed in the system of FIG. 1.

FIG. 7 is an exploded perspective view showing the manner in which one of the slide switches is operatively connected to one of the pedal adjusting mechanisms.

FIG. 8 is an exploded perspective view showing the relationship between various components of one of the slide switches.

FIG. 9 is an exploded perspective view showing the relationship between the carriage, the moveable contactor and the fixed contacts of one of the slide switches.

FIG. 10 is a fragmentary view showing the relationship between the moveable contactor and the carriage before they are fully assembled.

FIG. 11 is a fragmentary view, partly in section, showing the relationship of the moveable contactor and the carriage after they have been assembled by a self-adjusting method.

FIG. 12 is a fragmentary exploded perspective view showing details of a spring loaded connecting mechanism between one of the pedals and the moveable carriage of one of the switches.

FIG. 13 is a fragmentary sectional view showing the fully assembled relation of the components in FIG. 12.

FIG. 14 is a fragmentary schematic elevation showing some of the components to form a connection between one of the pedals and the moveable carriage of one of the slide switches.

FIG. 15 is a schematic end view, partly in section, showing the components illustrated in FIG. 14.

DETAILED DESCRIPTION OF ILLUSTRATIVE EMBODIMENTS

Figure 1:
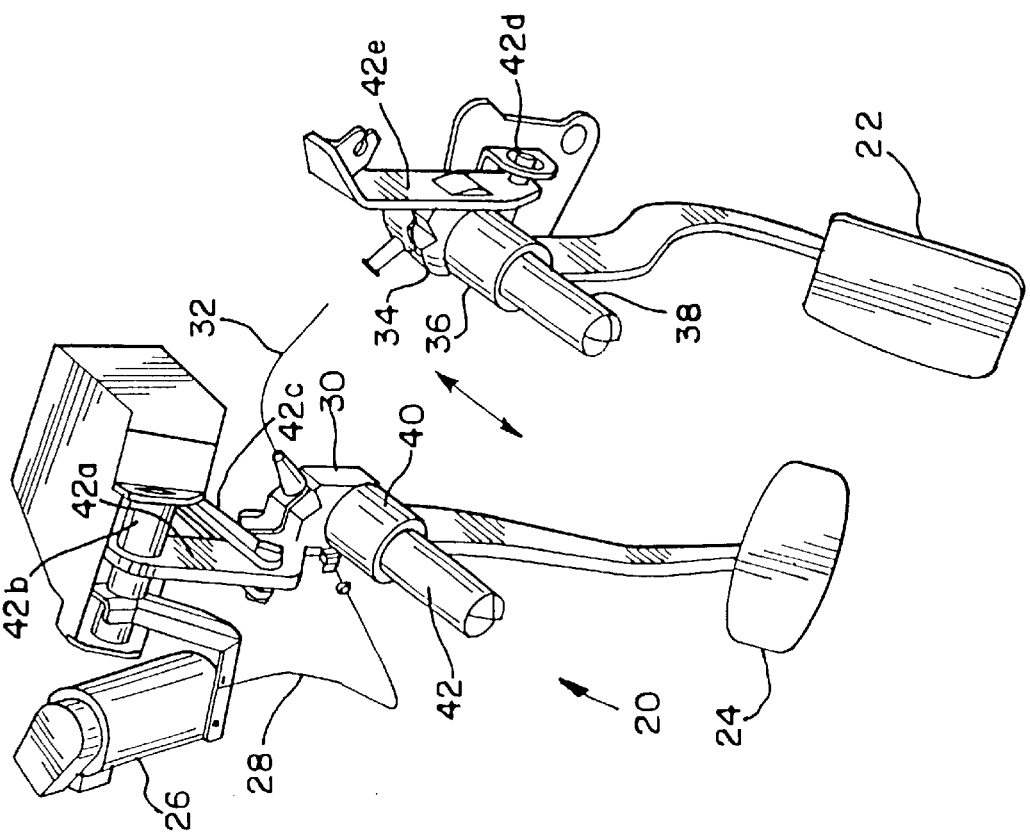
FIG. 1 is a somewhat diagrammatic perspective view of a typical adjustable pedal system in which the safety switching system of the present invention is incorporated, by way of example.

As previously indicated, FIG. 1 shows a pedal adjusting mechanism 20 for producing a fore and aft adjustment of an accelerator pedal 22 and a brake pedal 24 in an automotive vehicle, so that the driver can move the pedals toward and away from her for comfortable operations, according to her height and the length of her legs. The motive power is provided in this case by an electric motor 26 which is connected by a flexible rotary power transmitting cable 28 to a brake pedal adjusting mechanism 30. Another flexible rotary power cable 32 is connected between the brake pedal adjusting mechanism and an accelerator pedal adjusting mechanism 34.

The accelerator pedal 22 is connected to a sleeve or slider 36 which is movable along a supporting tube 38 by the adjusting mechanism 34. Similarly, the brake pedal 24 is connected to a sleeve or slider 40 which is slid able along a supporting tube 42 by the brake pedal adjusting mechanism 30. The supporting tubes 38 and 42 are pivotally mounted on the wall between the passenger cab and the engine compartment of the automotive vehicle. The brake pedal adjusting mechanism 30 and the supporting tube 42 are solidly connected together. The adjusting mechanism 30 is solidly connected to a lever arm 42a which is secured to a pivoted hub 42b, whereby the brake pedal 24, the slid able sleeve 40, the supporting tube 42 and the lever arm 42a are swing ably mounted. A clevis 42c is pivotally connected to the lever arm 42a and is employed to operate the brake cylinder in the usual manner. Thus, the brake pedal 24 is swing able toward the front of the vehicle to operate the brakes and is returned rearwardly by the usual return spring when the driver releases the brake pedal 24. The components shown in FIG. 1 are also shown in the exploded views of FIGS. 2 and 3.

The supporting tube 38 for the accelerator pedal 22 is solidly connected to the adjusting mechanism 34 which is swing able about a pivot 42d. A lever arm 42e is solidly connected to the adjusting mechanism 34 and is employed to operate the throttle of the automotive vehicle in the conventional manner. When the operator applies pressure to the pedal 22 with her foot, the pedal 22, the supporting tube 38, the adjusting mechanism 34 and the lever arm 42e are swung about the pivot 42d to increase the speed and power developed by the engine. When the operator releases the accelerator pedal 22, it is spring returned in the usual manner to its initial position, shown in FIG. 1.

Figure 4:
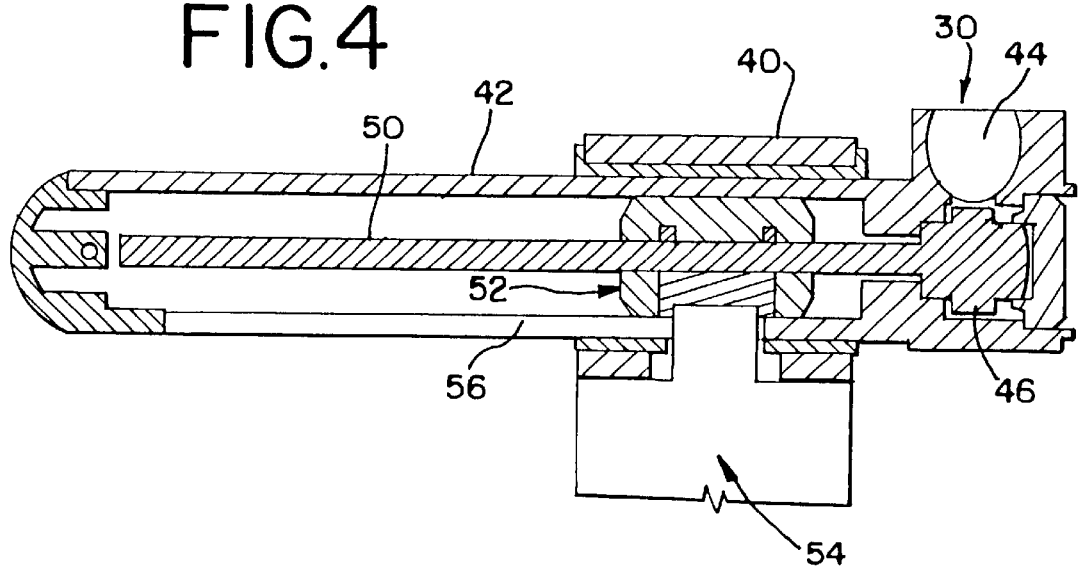
FIG. 4 is a somewhat diagrammatic longitudinal sectional view showing a typical adjustment mechanism which is one of two such mechanisms employed in the system of FIG. 1 for adjusting the accelerator pedal and the brake pedal.

The longitudinal sectional view of FIG. 4 shows many of the details of the adjustment mechanism 30 for the brake pedal 24. The adjustment mechanism 34 for the accelerator pedal is essentially the same as the mechanism 30 illustrated in FIG. 4.

The rotary drive cable 28 rotates a worm gear 44 which meshes with a worm wheel 46 secured to one end of a long drive screw 50 extending axially within the stationary supporting tube 42 for the sleeve or slider 40 that is connected to the brake pedal 24. A two piece drive nut 52 meshes with the drive screw 50 and is connected to the brake pedal 24 by an arm 54 which has an upper portion that extends through a longitudinal slot 56 in the stationary supporting tube 38 along which the sleeve 40 is slid able. The rotation of the drive screw 50 causes the nut 52 to travel longitudinally within the supporting tube 42 so that the brake pedal 24 is caused to move in a fore and aft direction.

The rotary drive cable 28 from the electric motor 26 causes rotation of the worm gear 44 when the electric motor 26 is energized. The rotation of the worm gear 44 causes rotation of the worm wheel 46 and the drive screw 50, so that the nut 52 is caused to travel longitudinally within the supporting tube 42. The brake pedal 24 and the arm 54 travel with the drive nut 52. The electric motor 26 is reversible so that the brake pedal 24 can be adjusted in a fore and aft direction in either direction under the control of the driver, who energizes the motor 26 by means of an electrical control switch, which may be mounted on an instrument panel of the automotive vehicle.

The rotary drive cable 32 transmits the rotary power from the adjustment mechanism 30 for the brake pedal 24 to the adjustment mechanism 34 which causes the accelerator pedal 22 to be adjusted either in a fore or aft direction, in unison with the brake pedal 24, assuming that all of the drive components between the electric motor 26 and the accelerator and brake pedals 22 and 24 are in good working order. The simultaneous movement of the accelerator pedal 22 and the brake pedal 24 maintains them in alignment.

However, if the rotary drive cable 32 for the accelerator pedal adjustment mechanism 34 should become broken due to some mishap, the accelerator pedal 22 will not be moved in unison with the brake pedal 24, so that a serious misalignment between the pedals 22 and 24 can be produced by operation of the electric motor 26. Such misalignment can produce an unsafe condition, in which the driver may be able to reach the accelerator pedal 22 easily, while the brake pedal 24 cannot easily be reached by the driver. The reverse situation can also be produced, depending upon the direction in which the brake pedal 24 is moved and the position of the accelerator pedal 22 when the failure of the rotary drive cable 32 occurs.

Damage to other components of either adjustment mechanism 30 or 34 can also cause the mechanism to fail, so that the accelerator pedal 22 or the brake pedal 24 will not be moved when the electric motor 26 is energized. Such damage may be caused to the worm gear 44, the worm wheel 46, the drive screw 50 and the drive nut 52. In the case of the adjustment mechanism 30 for the brake pedal 24, damage to any of the same drive components can cause failure of the brake pedal 24 to be moved when the electric motor 26 is energized, so that a serious and unsafe misalignment can be produced between the accelerator pedal 22 and the brake pedal 24.

The present invention provides a method and means for detecting any significant misalignment between the accelerator pedal 22 and the brake pedal 24, and for causing the electric motor 26 to be de-energized so that it can not be energized by the operation of the control switch by the driver.

Figure 5:
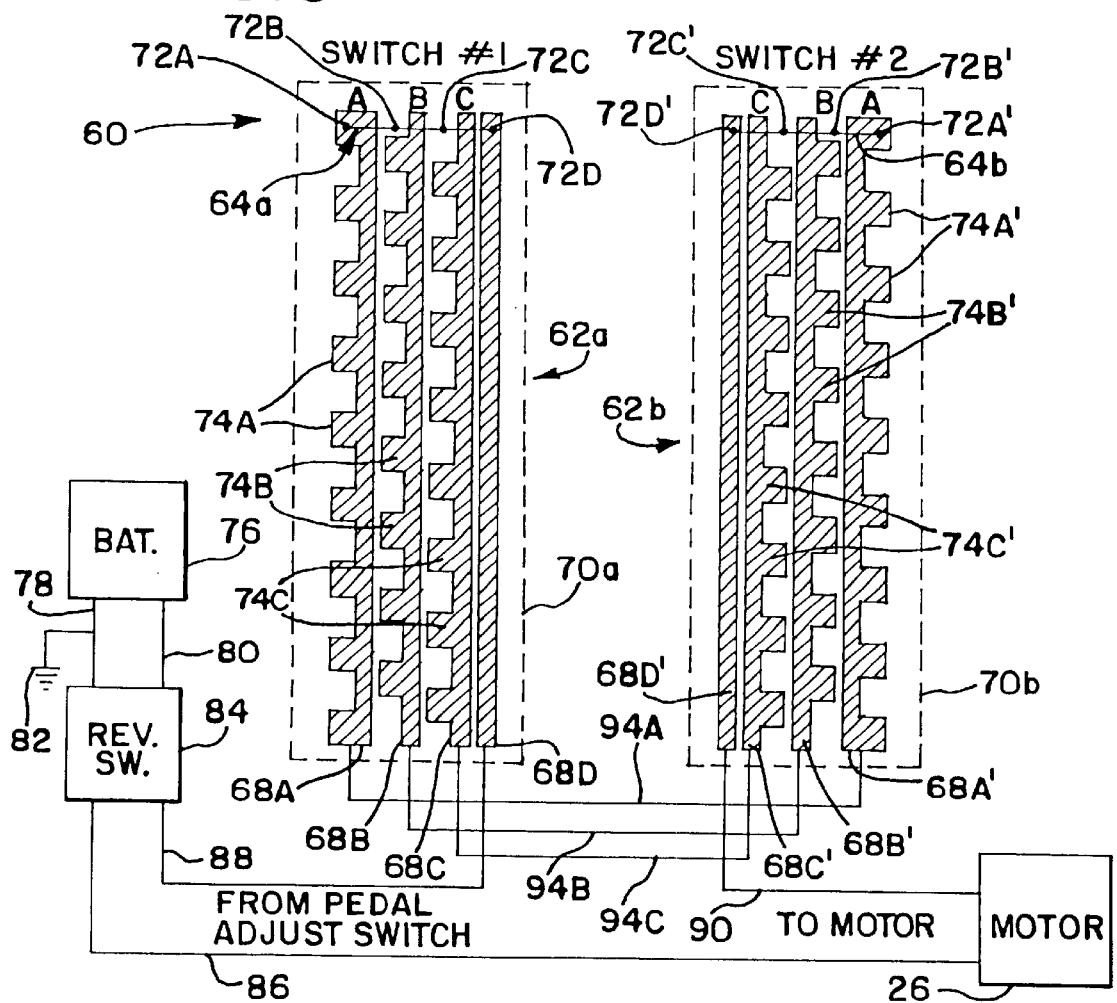
FIG. 5 is a schematic sectional view of a safety switching system employed in the pedal adjustment system of FIG. 1 and incorporating first and second slide switches operable by the accelerator pedal adjusting mechanism and the brake pedal adjusting mechanism for sensing or detecting any appreciable misalignment of the pedals.

FIG. 5 is a diagrammatic representation of a safety switching system 60 for sensing or detecting any significant misalignment of the accelerator and brake pedals 22 and 24 and for de-energizing the electric motor 26 before any serious misalignment develops. The safety switching system 60 comprises two slide switches 62a and 62b, connected to the slid able sleeves 36 and 40 and operable by the adjusting movement of the accelerator pedal 22 and the brake pedal 24. The switches 62a and 62b are shown as linear slide switches, but rotary switches of a similar construction can be employed. The slide switches 62a and 62b are shown diagrammatically in FIG. 5 as mirror images, reversed from left to right, but may be and usually are identical.

As shown diagrammatically in FIG. 5, the slide switch 62a comprises a shorting bar or bridging contactor 64a which is connected to and moveable with the slid able sleeve 36 connected to the accelerator pedal 22. As shown in FIG. 8, the contactor 64a is mounted on a carriage 66 made of an electrically insulating material. The carriage 66 is moveable with the sleeve or slider 36 for the accelerator pedal 22. As shown in FIG. 5, the contactor 64a is slid ably engaged with four contact strips 68A, 68B, 68C and 68D which are mounted on an electrically insulating body 70a.

The contactor 64a has four contactor elements 72A, 72B, 72C and 72D. The contactor element 72D is slid ably engaged at all times with the contact strip 68D, which is shown in the form of a simple elongated rectangular strip, which may be referred to as the common contact member strip 68D.

The contact strips 68A, 68B and 68C are elongated and substantially parallel with the contact strip 68D. The contact strip 68A is formed with a series of laterally projecting evenly spaced contact tabs 74A with spaces there between. The second contact strip 68B is formed with laterally projecting, evenly spaced contact tabs 74B with spaces there between. The third contact strip 68C is formed with a series of laterally projecting, evenly spaced contact tabs 74C with spaces there between.

The first, second and third contactor elements 72A, 72B and 72C are movable into and out of engagement with the successive contact tabs 74A, 74B and 74C, respectively.

The electrical circuit between the common contact strip 68D and the first contact strip 68A is closed or made when the contactor element 72A is moved into engagement with the successive contact tabs 74A, and is open or broken when the contactor element 72A is moving across the spaces between the contact tabs 74A, at which time the contactor element 72A engages the insulating body 70a.

Similarly, the circuit between the common contact strip 68D and the second contact strip 68B is closed or made when the contactor element 72B is moved into engagement with the second contact tabs 74B, and is open or broken when the second contactor element 72B is moving across the spaces between the contact tabs 74B. Likewise, the electrical circuit between the common contact strip 68D and the third contact strip 68C is closed or made when the third contactor element 72C is moving along the contact tabs 74C, but is open or broken when the contactor element 72C is moving across the spaces there between.

The width of the contact tabs 74A, 74B and 74C is the same, and the width of the spaces between the respective contact tabs 74A, 74B and 74C is the same. For this embodiment, the width of the contact tabs 74A, 74B and 74C is the same as the width of the basis between the respective contact tabs. However, in other embodiments, the width of the contact tabs 74A, 74B and 74C may be either larger or smaller than the width of the spaces between the respective contact tabs 74A, 74B and 74C.

Each of the three circuits between the common contact strip and the switching contact strips 68A, 68B and 68C is alternately closed and opened when the contactor elements 72A, 72B, 72C and 72D are moved along the four contact strips 68A, 68B, 68C and 68D. However, due to the offsetting or staggering of the contact tabs 74A, 74B and 74C, one of the three circuits is always closed, because of its overlapping of the closure intervals in the three circuits. Thus, the three circuits together have a make before break action.

As previously indicated, the second slide switch 62b is connected to the slid able sleeve 40 and is operable by the adjusting movement of the brake pedal 24. The second slide switch 62b is the same as the first slide switch 62a, except that the second slide switch 62b is diagrammatically illustrated in FIG. 5 as a mirror image of the first slide switch 62a, so that the positions of the components are reversed from left to right. However, both slide switches 62a and 62b may be and usually are identical in construction.

In order that the previous description of the first slide switch 62a may easily be applied to the second slide switch 62b, and to avoid unnecessary repetition of such description, the individual components of the second slide switch 62b are identified in FIG. 5 by the same reference characters, except that each reference character applied to the second switch 62b is followed by an apostrophe (').

The electrical circuit diagram of FIG. 5 shows the manner in which the slide switches 62a and 62b are connected to the electric motor 26. Energization for the motor 26 is supplied by the usual automotive battery 76 and the output leads 78 and 80. The lead 78 is connected to the automotive body or frame 82, which is indicated by the ground symbol. The leads 78 and 80 are connected to a manually operable reversing switch 84 whereby the driver of the vehicle can energize the electric motor 26 with a voltage of either a forward or reverse polarity, to cause the motor to adjust the accelerator and brake pedals in either a forward or reverse direction. The switch 84 may be a conventional toggle switch having a central OFF position, as well as forward and reverse positions. The switch 84 may be a conventional double pole, double throw type.

Output leads 86 and 88 are connected to the reversing switch 84. The output lead 86 is connected directly to the electric motor. The first and second slide switches 62a and 62b are connected in series between the output lead 88 and a second input lead 90 extending to the motor 26.

As shown in FIG. 5, the second output lead 88 of the reversing switch is connected to the common contact strip 68D of the first slide switch 62a. The second input lead 90 of the motor 26 is connected to the common contact strip 68D' of the second slide switch 62b. The corresponding contact strips of the first and second slide switches 62a and 62b are connected together by three additional leads 94A, 94B, and 94C.

It will be recalled that the first shorting bar contactor 64a is moved in unison with the adjusting movement of the accelerator pedal 22, while the second shorting bar contactor 64b is moved in unison with the brake pedal 24. If the adjusting movements of the accelerator pedal 22 and the brake pedal 24 are synchronized, the series circuit through the first and second slide switches 62a and 62b and between the leads 88 and 90 is closed or made at all times. However, if the synchronization between the first and second switches 62a and 62b is not maintained, due to failure of one of the pedal adjusting mechanisms 30 and 34, the circuit between the leads 88 and 90 and through the first and second switches 62a and 62b will be opened or broken after a minimum misalignment is produced between the accelerator and brake pedals 22 and 24.

It will be understood that the switching circuit comprising the common contact strip 68D, the contactor 64a and the contact strip 68A is closed when the contactor element 72A engages any of the series of contact tabs 74A, and is open when the contactor element 72A is engaging the insulating body 70a along the spaces between the tabs 74A. In the second slide switch 62b, the circuit between the common contact strip 68D' and the first contact strip 68A' is closed when the contactor element 72A' is engaging any of the tabs 74A' and is open when the contactor element 72A' is engaging the insulating body 70b across the spaces between the tabs 74A'. These two switching circuits are connected in series by the lead 94A.

If the adjusting movements of the accelerator pedal 22 and the brake pedal 24 become out of synchronism, due to a misalignment of the accelerator pedal 22 and the brake pedal 24, the open circuit portions become substantially greater than the closed circuit portions of the cycles produced by adjusting movement of the accelerator and brake pedals 22 and 24. This is also true as to the switching cycles in the series circuits comprising the common contact 68D, the contactor 64a, the contact strip 68B, the contact strip 68B', the contactor 64b, and the common contact strip 64D', as well as in the series switching circuit comprising the common contact strip 68D, the contactor 64a, the contact strip 68C, the contact strip 68C', the contactor 64b and the common contact strip 68D'. The three series circuits mentioned above are connected in parallel between the leads 88 and 90.

If the accelerator and brake pedals 22 and 24 are aligned, or nearly so, one of the three series circuits is always closed, so that the motor 26 is continuously energized. If a sufficient misalignment develops between the adjustment of the accelerator and brake pedals 22 and 24, a situation will be produced in which all three of the series circuits are open, with the result that the motor 26 will be de-energized so that any further adjusting movement of the accelerator and brake pedals 22 and 24 will be impossible, until the misalignment is corrected. In most instances, the de-energization of the motor 26 is caused by failure of one of the adjusting mechanisms 30 and 34 for the brake and accelerator pedals 24 and 22. A misalignment which is sufficiently great to cause de-energization of the motor 26 is often referred to herein as a significant misalignment.

Figure 6:
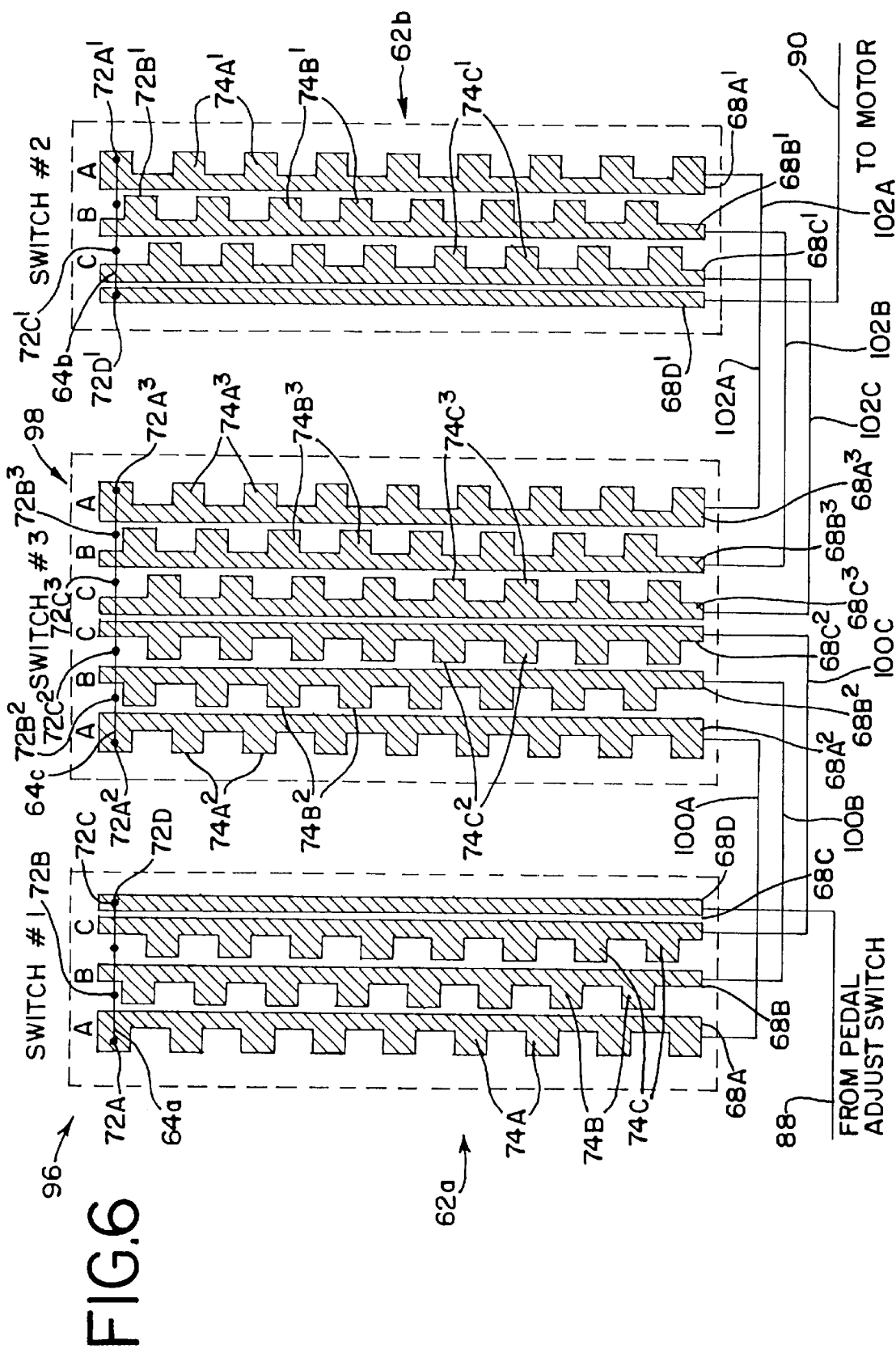
FIG. 6 is a schematic sectional view of a safety switching system incorporating a third slide switch operable by a third pedal, usually an adjustable clutch pedal, for sensing any appreciable misalignment of any of the three switches relative to the other two switches.

FIG. 6 illustrates a modified safety switching system 96 which is adapted to be used in connection with an automotive vehicle having three pedals, the positions of which need to be adjusted to suit the height and leg length of the driver. Generally, the first two pedals are the accelerator and brake pedals, while the third pedal is a clutch pedal. The safety switching system 96 detects any significant misalignment of any of the three pedals and de-energizes the electric motor 26 which is employed to operate the three mechanisms for adjusting the positions of the three pedals.

The safety switching system 96 employs the same first and second slide switches 62a and 62b, as previously described. In addition, the safety switching system 96 employs a third slide switch 98 which is more complicated than the slide switches 62a and 62b, but employs some of the same components. To avoid unnecessary repetition or the detailed description, corresponding components of the third switch 98 will be given the same reference characters as employed in FIG. 5, but with the superscripts 2 and 3, in most instances.

As shown in FIG. 6, the third switch 98 comprises a shorting bar or bridging contactor 64c which is slid ably engage able with six contact strips, three of which are the same as the contact strips 68A, 68B and 68C, and thus are designated in FIG. 6 as $68A^2$, $68B^2$ and $68C^2$. The other three contact strips of the switch 98 are the same as the contact strips 68A', 68B' and 68C', and thus are designated in FIG. 6 as $68A^3$, $68B^3$ and $68C^3$.

The third slide switch 98 is connected into the circuit between the pedal adjust reversing switch 84 and the electric motor 26. The lead 88 from the switch 84 is connected to the common contact strip 68D of the first slide switch 62a, the same as in FIG. 5. The lead 90 to the motor 26 is connected to the common contact strip 68D', the same as in FIG. 5.

An additional lead 100A is connected between the first contact strip 68A of the first slide switch 62a and the first contact strip $68A^2$ of the third slide switch 98.

Another lead 100B is connected between the second contact strip 68b of the first switch 62a and the second contact strip $68B^2$ of the third switch 98. Similarly, a lead 100C is connected between the third contact strip 68C of the first switch 62a and the third contact strip $68C^2$ of the third switch 98.

Another lead 102A is connected between the first contact strip 68A' of the second switch 62b and the corresponding contact strip $68A^3$ of the third switch 98. A lead 102B is connected between the second contact strip 68B' of the second switch 62b and the corresponding contact strip $68B^3$ of the third switch 98.

A third lead 102C is connected between the third contact strip 68C' of the second switch 62b and the corresponding contact strip $68C^3$ of the third switch.

It will be seen that the third switch 98 has a shorting bar contactor 64c which is provided with six contactor elements $72A^2$, $72B^2$, $72C^2$, $72C^3$, $72B^3$ and $72A^3$ which are moveable into and out of engagement with the contact tabs $74A^2$, $74B^2$, $74C^2$, $74C^3$, $74B^3$ and $74A^3$ which project laterally on the contact strips $68A^2$, $68B^2$, $68C^2$, $68C^3$, $68B^3$ and $68A^3$, respectively.

When the three pedal adjusting mechanisms for the accelerator pedal, the brake pedal and the clutch pedal produce adjusting movement of the pedals in unison, the contactors 64a, 64b and 64c are moved in unison. In this state of affairs all three of the slide switches 62a, 62b and 98 are closed or made at all times throughout the range of synchronized movement of the contactors 64a, 64b and 64c, so that the motor 26 is energized whenever the driver operates the pedal adjust switch 84. However, if there is a failure of one of the pedal adjusting mechanisms, the corresponding contactor will not be moved when the other two contactors are moved. When the operative contactors are moved sufficiently to cause a significant misalignment of the pedals, an open circuit will develop in the series connection of the slide switches 62a, 62b and 98, with the result that the motor 26 will be de-energized. Consequently, the pedal adjustment mechanisms will not be operated any longer, when the driver operates the switch 84. This situation will persist until the failure in the inoperative pedal adjustment mechanism is corrected.

In the two-switch system 60 of FIG. 5, the width of all of the contact tabs is the same. Moreover, all of the spaces between all of the contact tabs have the same width. For the embodiment of FIG. 5, all of the contact tabs and the spaces between the contact tabs have the same width. However, in other embodiments, the width of the contact tabs can be either greater or smaller than the width of the spaces between the tabs. The switching system 60 of FIG. 5 comprises six sets of contact tabs 74A, 74B, 74C, 74A', 74B' and 74C'.

In the three-switch switching system 96 of FIG. 6, all of the contact tabs have the same width. Moreover, all of the spaces between the contact tabs have the same width. In the embodiment of FIG. 6, the width of the contact tabs is the same as the width of the spaces between the tabs. However, in other embodiments, the width of the contact tabs can be either greater or smaller than the width of the spaces between the tabs. The embodiment of FIG. 6 comprises twelve sets of contact tabs 74A, 74B, 74C, 74A', 74B', 74C', $74A^2$, $74B^2$, $74C^2$, $74A^3$, $74B^3$ and $74C^3$.

The widths of the contact tabs and spaces are a function of two variables: 1) the travel distance of make-before-break (m) and 2) the travel distance a single circuit is energized (s). It can be derived mathematically that the width of a tab equals 2m+s, and that the width of the spaces between tabs equals 2s+m. The distance m wants to be as large as possible to permit the normally functioning circuit to be robust against the normal forward and reverse hysteresis that will be present in the pedal motion. However, the maximum distance the switches can be misaligned before shutdown is equal to the tab width (2m+s), which must be sufficiently small to permit the abnormally functioning system to be shut down without significant pedal misalignment. Furthermore, s cannot be made too small, or all three circuits could be energized at once when all manufacturing tolerances are included, which would prevent shutdown if there was a fault condition. These considerations have led to the design decision for the embodiments of FIGS. 5 and 6 to let m be equal to s, which results in equally sized tabs and spaces. For other embodiments m and s may be adjusted, which could make the tab width larger or smaller than the space width.

During a fault condition when the pedals are not moving in synchronization with each other, there are two possible switching sequences that could occur to shut down the motor 26. The first possibility is that the switch on the pedal that becomes disabled will be stopped such that only one of the three circuits A, B, or C is connected by the shorting bar contactor to the common contact. The other switch (or switches for the three pedal system) could move only as far as the distance required to make the next circuit in the repeating A-B-C sequence and drop the previous circuit. For example, if the accelerator pedal 22 were disabled such that its switch 62a was stopped with circuit A made, the brake pedal 24 could only move the short distance needed for its switch 62b to make circuit B and drop circuit A.

The second possibility is that the switch on the pedal that becomes disabled will be stopped such that it is in the small make-before-break region (m from above), and two of the three circuits are connected by the shorting bar contactor to the common contact. The other switch (or switches for the three pedal system) could move only as far as the distance required to drop one of the two circuits, make the next circuit in the repeating A-B-C sequence and drop the last remaining previous circuit. For example, if the accelerator pedal 22 were disabled such that its switch 62a was stopped with circuit A and B made, the brake pedal 24 could only move the short distance needed for its switch 62b to drop circuit A, make circuit C and drop circuit B.

For both possibilities and for both the two and three pedal systems, the basic switching principle during a fault condition is the same: the functional pedal switch(es) will only have to move a small distance to find a circuit that is not maintained by the disabled pedal switch(es), and the series circuit between the selector switch 84 and the motor 26 will then be interrupted.

FIG. 7 is an exploded perspective view of a construction whereby one of the slide switches may be connected to one of the foot pedals for an automotive vehicle, so that the switch can sense or detect the adjusting movement of the pedal. In this case, the pedal involved is the brake pedal 24 and the switch involved is the second slid able switch 62b. However, the construction of FIG. 7 is applicable to the accelerator pedal 22 and the clutch pedal, if present in the automotive vehicle.

FIG. 7 shows the brake pedal adjusting mechanism 30 which is operable to move the sleeve or slider which is connected to the brake pedal 24 and is slid able along the supporting tube 42.

As previously mentioned, switch 62b has a body 70b, preferably made of an electrical insulating material, such as a resinous plastic. The body 70b incorporates a terminal head 108. A generally rectangular casing or housing 110 which is suitably secured to the body 70b by means such as the illustrated tabs 112, bent over against the body 70b. A first generally U-shaped bracket 114 is secured to the housing 110 and is provided with down-turned flanges 116 adapted to be connected to the pedal adjusting mechanism 30 by a cap screw or bolt 118 which is intended to be inserted through a hole 120 in one of the flanges 116 and screwed into an internally threaded opening 122 in the pedal adjusting mechanism 30, to which the supporting tube 42 is attached.

A second generally U-shaped bracket 124 is secured to the switch housing 110 and is formed with a pair of down-turned flanges 126 having holes 128 therein for receiving a pin 130, adapted to be inserted through diametrically opposite holes 132 in the end portion of the supporting tube 42. A nose piece or plug 134 is insert able into the outer end of the supporting tube 42 and is formed with a diametrical hole 136 for receiving the pin 130, which thus serves to secure both the nose piece 134 and the bracket 124 to the outer end of the supporting tube 42. The pin 130 may be press fitted into the holes 128, 132 and 136, or otherwise suitably secured therein. Other suitable fasteners can be employed.

FIG. 8 is an exploded perspective view which represents either of the slide switches 62a or 62b. In FIG. 8, the rear bracket 114 and the front bracket 124 are shown separately, before they are secured to the casing or housing 110. It will be seen that both the rear bracket 114 and the front bracket 124 are formed with tubular rivets or eyelets 138 struck from or otherwise formed in one piece with the brackets 114 and 124, so that the rivets or eyelets 138 can be employed to secure the brackets 114 and 124 to the casing or housing 110.

Details of the shorting bar contactors 64a and 64b are illustrated in FIGS. 8, 9, 10 and 11. As shown, each of the contactors 64a and 64b is made of resilient sheet metal, such as a copper alloy, having good electrical conductivity. Each of the contactors 64a and 64b has a shorting bar portion 140 formed in one piece with the contactor elements 72A, 72B, 72C and 72D, which are illustrated in the form of leaf spring contacts or fingers for resilient engagement with the contact strips 68A, 68B, 68C and 68D, in the first slide switch 62a.

The electrically insulating carriage 66 is illustrated in an upright position in FIG. 8 and in an inverted position in FIG. 9. The sheet metal contactor 64A or 64B is adjustably secured to the carriage 66. As shown in FIG. 8, the carriage 66 is generally rectangular, but has a lower step 142 and an upper step 144. The shorting bar portion 140 of the contactor is slid able along the lower step 142 during the initial assembly of the contactor 64a or 64b with the carriage 66.

As shown in FIGS. 8 and 9, the contactor 64a or 64b has a tapered mounting tab or prong 146 which is adapted to be press-fitted into a slot 148 formed in the upper step 144 of the carriage 66.

The tab or prong 146 on the contactor 64a or 64b has a pair of oppositely facing tapering edges 150 which are serrated with teeth 151 that favor the press-fitting of the prong 146 into the slot 148, while strongly resisting withdrawal of the prong 146 from the slot 148.

To provide for self adjustment of the relative positions of the contactors 64a and 64b, the contact strips 68A and 68D are provided with tabs 152 which project downwardly into the paths of the extreme end portions 154 of the shorting bar portion 140 of each contactor 64a and 64b. When the slide switches 62a and 62b are first assembled, the contactors 64a and 64b are only partially press-fitted into the carriages 66, so that the contactors are securely retained therein but are not fully adjusted. When the switches 62a and 62b are fully installed in the automotive vehicle so that the carriages 66 are moveable in unison with the fore and aft adjusting movement of the accelerator and brake pedals 22 and 24, the installer adjusts the positions of the contactors 64a and 64b by energizing the adjusting mechanisms 30 and 34 for the brake pedal 24 and the accelerator pedal 22, so that both pedals are fully extended toward the driver. During this initial movement of the accelerator and brake pedals 22 and 24, the end portions 154 of the shorting bar portions 140 of the contactors 64a and 64b engage the respective pairs of tabs 152 on the contact strips 68A and 68D, so that the mounting tabs or prongs 146 on each of the contactors are pushed farther into the slots 148 in the carriages 66. In this way, the positions of the contactors 64a and 64b are automatically self adjusted. No further adjustment is required, unless one or both of the slide switches 62a and 62b are removed and replaced.

As previously indicated, the carriage 66 of each of the slide switches 62a, 62b and 98 is connected to and operable by the moveable pedal supporting sleeve 40 of the corresponding pedal adjusting mechanism 20. A special spring-loaded connection 160 is provided between each sleeve 40 and the corresponding carriage 66, as illustrated in FIGS. 7–9 and 12–15. The connection 160 comprises a special saddle bracket 162, illustrated to best advantage in FIGS. 12–14. The saddle bracket 162 is adapted to be mounted on the sleeve 40 of the pedal adjusting mechanism 20, as shown in FIGS. 14 and 15. The bracket 162 has a pair of accurately curved members 164 adapted to straddle the upper periphery of the sleeve 40 near its opposite ends. An upstanding lever portion 166 extends upwardly and is formed in one piece with the accurately curved members 164. Each of the members 164 has a pair of L-shaped tabs 168 which are bent radially inwardly from the straddle members 164 for engaging opposite ends of the sleeve 40. If necessary, the tabs 168 can be welded or brazed to the sleeve 40. However, the spring loading of the saddle bracket 162 is normally sufficient to retain the bracket and the members 164 on the sleeve 40.

As shown in FIGS. 12 and 13, a tab or tongue 170 projects upwardly on the lever 166 and is slid ably received in a slot 172 formed in the underside of the carriage 66. The tab 170 and the slot 172 provide for limited up and down sliding movement between the tab 170 and the carriage 66. This slid able connection is spring loaded by spring means, illustrated as a compression coil spring 174, compressed between the carriage 66 and the lever portion 166 of the saddle bracket 162. The coil spring 174 is received and retained in a circular, downwardly facing groove or spring seat 176 in the underside of the carriage 66 and a pair of notches 178, forming a spring seat in the lever 166. The notches 178 are spaced outwardly from the edges of the tab 170.

The spring loaded connection 160 between the sleeve 40 and the switch carriage 66 accommodates a limited amount of up and down movement between the sleeve 40 and the carriage 66, as well as a small amount of tilting movement. For convenience in assembling the spring loaded connection 160 and in installing the switching system in the automotive vehicle, a resilient catch 180 is provided in the slot 172 formed in the carriage 66. The catch 180 comprises a ratchet tooth 182 formed on a flexible resilient arm 184 formed on the carriage 66 in the slot 172. The tooth 182 and the arm 184 are molded in one piece with the carriage 66. The ratchet tooth 182 is adapted to be slid ably received in a vertically elongated slot 186 formed in the tab 170 extending upwardly on the lever portion 166 of the saddle bracket 162. When the tab 170 is pushed upwardly into the slot 172, the tab 170 engages the ratchet tooth 182 and flexes the resilient arm 184 of the catch 180 until the tooth 182 snaps into the slot 186 in the tab 170. The ratchet tooth 182 of the resilient catch 180 retains the tab 170 in the slot 172, so that the saddle bracket 162 and the corresponding slide switch 62a, 62b or 98 form a subassembly for easy assembly in the automotive vehicle. The vertical elongation of the slot 186 provides for relative up and down movement of the saddle bracket 162 and the switch carriage 66.

In the case of some pedal adjusting mechanisms, there is no need to provide spring loading in the connection between each adjustable pedal and the corresponding slide switch 62a, 62b or 98, in which case a much simpler connection can be employed.

As previously described in connection with FIG. 5, the contact tabs 74A, 74B and 74C are spaced apart between the centers of the tabs by equal distances, or approximately so. The same applies to the contact tabs 74A', 74B' and 74C'.

The successive contact tabs 74A, 74B and 74C on the successive contact members or strips 68A, 68B and 68C are successively offset or staggered by a distance amounting to approximately ⅓ of the spacing distance between the centers of the successive contact tabs 74A, 74B and 74C, as will be evident from FIG. 5. The same applies to the offsetting between the successive sets of contact tabs for the second slide switch 62B illustrated in FIG. 5.

As previously described, FIG. 6 illustrates a third slide switch 98 having six sets of contact tabs projecting laterally from six contact members. The contact tabs of all of the six sets are spaced apart by substantially equal spacing distances between the centers of the tabs. Moreover, the contact tabs of the six sets are staggered or offset by an amount corresponding to approximately ⅓ of the spacing distance between centers, as will be evident from FIG. 6.

Figure 2:
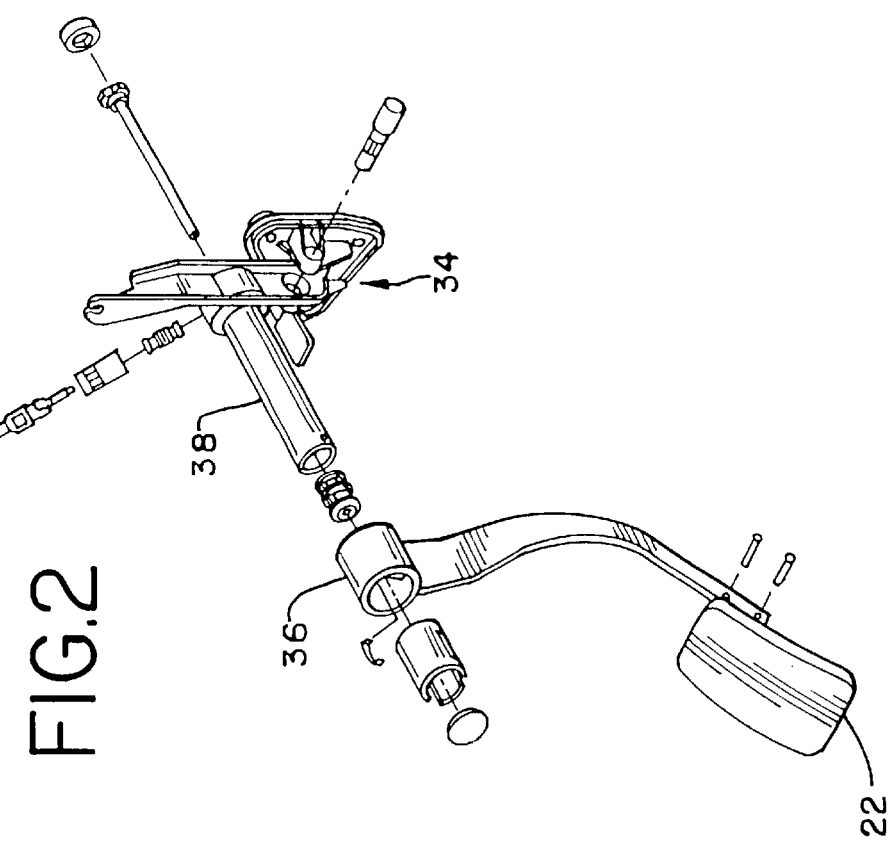
FIG. 2 is an exploded perspective view showing additional details of the adjustable accelerator pedal employed in the system of FIG. 1.

As previously described, the pedal adjusting mechanism 20 shown in FIGS. 1 and 2 employs a single electrical drive motor 26 to operate the adjusting mechanisms for both of the pedals 22 and 24. Flexible rotary power transmitting cables 28 and 32 are connected between the motor 26 and the mechanisms for adjusting the positions of both pedals 22 and 24. It will be evident to persons skilled in the art that two separate drive motors could be employed to operate the adjusting mechanisms for both pedals 22 and 24. Both electrical motors would then be connected to the output of the electrical system shown in FIG. 5.

Two or three separate electrical motors could be employed for adjusting all of the pedals in the 3-pedal system of FIG. 6. All of the motors would be connected to the output of the electrical system of FIG. 6. To avoid unsafe misalignment of the pedals, all of the electrical drive motors need to be de-energized, if the pedal adjusting system for any of the pedals becomes inoperative.

We claim:

1. A safety switching system for preventing serious misalignment of at least first and second control pedals, each of which is adjustable in position by an electrical drive system comprising at least one reversible electrically operable motor having a rotary shaft and at least first and second mechanical conversion devices for converting the rotary motion of the shaft into back and forth movement of the first and second pedals, said safety switching system comprising at least first and second slide switches, each of which comprises first and second body members, one of which is stationary while the other is moveable with one of said pedals, each of said slide switches having an electrically insulating support on the corresponding first body member, at least first, second and third elongated electrically conductive contact members mounted on said insulating support, an electrically conductive common contact member on said insulating support and generally parallel with said contact members, a movable bridging contactor mounted on said second body member for relative movement along said contact members and said common contact, said bridging contactor having contactor elements for slidably engaging said contact members and said common contact, said first, second and third contact members having respective first, second and third sets of equally spaced contact tabs extending therefrom for slid able engagement by said respective first, second and third slid able contactor elements, said first, second and third sets of contact tabs being successively staggered equally along the length of said contact members, a power supply circuit including a pair of input terminals for receiving electrical power from a suitable source, a reversible electrical control switch connected in the power supply circuit between said input terminals and said motor for supplying electrical power of reversible polarity to said motor for selectively causing operation of said motor in opposite directions of rotation, and means for connecting said common contacts of said first and second slide switches in series with said power supply circuit, and means including a set of three conductors for connecting said first, second and third contact members of said first switch to the respective first, second and third contact members of said second switch, whereby conductive continuity of the power supply circuit is maintained as long as the first and second pedals are aligned so that the bridging contactors of the first and second switches are kept substantially in alignment.

2. A safety switching system according to claim 1, in which said first body member of each of said slide switches is stationary, said second body member of each of said slide switches being adjustably moveable with the corresponding adjustable pedal.

3. A safety switching system according to claim 2, in which each of said bridging contactors is made in one piece of resilient sheet metal and comprises four resilient finger-like strips including smoothly rounded end portions for slid ably engaging said common contact and said contact tabs on said first, second and third contact members.

4. A safety switching system according to claim 3, in which each of said sheet metal contactors has a mounting prong extending in a direction opposite from the direction of the corresponding finger-like contactor strips, each of said second body members including a carriage made of electrically insulating material, each carriage having a slot therein for receiving and retaining one of said mounting prongs with an interference fit therebetween, each of said first body members having an abutment for engagement by one of said sheet metal contactors for arresting the forward movement thereof and causing the mounting prong to be pushed into the corresponding slot for automatically establishing an adjusted position of the corresponding contactor.

5. A safety switching system for preventing serious misalignment of at least first and second control pedals, each of which is adjustable in position by an electrical drive system comprising at least one reversible electrically operable motor having a rotary shaft and at least first and second mechanical conversion devices for converting the rotary motion of the shaft into back and forth movement of the first and second pedals, said safety switching system comprising at least first and second slide switches, each of which has an electrically insulating support, at least first, second and third elongated electrically conductive contact members mounted on said support, an electrically conductive common contact mounted on said support and generally parallel to said contact members, a movable bridging contactor, means for supporting said bridging contactor for movement along said contact members and said common contact, said bridging contactor having contactor elements for slid ably engaging said contact members and said common contact, said first, second and third contact members having respective sets of equally spaced contact tabs extending therefrom for slid able engagement by the respective first, second, and third slid able contactor elements, said first, second and third sets of contact tabs being offset equally along the length of said contact members, a power supply circuit including a pair of input terminals for receiving electrical power from a suitable source, a reversible electrical control switch connected in the power supply circuit between said input terminals and said motor for supplying electrical power of reversible polarity to said motor for selectively causing operation of said motor in opposite directions of rotation, means for connecting said common contacts of said first and second slide switches in series with said power supply circuit, means including a set of three conductors for connecting said first, second and third contact members of said first switch to the respective first, second and third contact members of said second switch, whereby conductive continuity of the power supply circuit is maintained as long as the first and second pedals are aligned so that the bridging contactors of the first and second switches are kept substantially in alignment.

6. A slide switch for a control system, said switch comprising an electrically insulating support, first, second and third generally parallel strip-like elongated contact members mounted on said insulating support, said first, second and third contact members having corresponding first, second and third sets of contact tabs formed on and spaced at equal intervals along said respective contact members, said tabs of all three sets being spaced apart by the same distance but the tabs of the three different sets being successively offset by an amount corresponding to approximately one-third of the spacing between the tabs of each set, an elongated strip-like common contact mounted on said insulating support and generally parallel with the first, second and third contact members, an electrically insulating carriage moveable along said insulating support and generally parallel with said contact members and said common contact, and a bridging contactor moveable with said carriage and along said first, second and third contact members and said common contact, said bridging contactor having contactor elements for engaging and short-circuiting said tabs on said contact members and said common contact, said bridging contactor extending generally perpendicular to said contact members and said common contact.

7. A slide switch according to claim 6, in which said bridging contactor is made in one piece of resilient sheet metal and comprises four resilient finger-like strips including smoothly rounded end portions for slid ably engaging said common contact and said contact tabs on said first, second and third contact members.

8. A slide switch according to claim 7, in which said sheet metal contactor has a mounting prong extending in a direction opposite from the direction of said finger-like contactor strips, said carriage having a slot therein for receiving and retaining said mounting prong with an interference fit therebetween, said insulating support having an abutment for engagement by said sheet metal contactor for arresting the forward movement thereof and causing the mounting prong to be pushed into said slot for automatically establishing an adjusted position of said contactor.

9. A slide switch for a control system, comprising an electrically insulating support, a first set of three strip-like contact members mounted on said support and constituting first, second and third contact members, a second set of three generally parallel strip-like contact members mounted on said insulating support and constituting fourth, fifth and sixth contact members, said first, second and third contact members having respective first, second and third sets of contact tabs projecting laterally therefrom and spaced apart from one another at approximately equal intervals between centers of said tabs and along said first, second and third contact members, said first, second and third sets of contact tabs being offset successively from one another by a distance corresponding to approximately one-third of the distance between the successive tabs, said fourth, fifth and sixth contact members having corresponding fourth, fifth and sixth sets of contact tabs projecting laterally from the respective fourth, fifth and sixth contact members and spaced apart at approximately equal intervals along said fourth, fifth and sixth contact members, said fourth, fifth and sixth sets of contact tabs being offset successively along said fourth, fifth and sixth contact members by a distance corresponding to approximately one-third of the spacing between the tabs of each set, an electrically insulating carriage moveable longitudinally along said insulating support generally parallel with all of the six contact members on said support, and an electrically conductive bridging contactor mounted on said carriage and extending generally perpendicular to said contact members, said contactor having a set of six contactor elements for conductively engaging the respective six sets of contact tabs on the six contact members, said contactor elements being effective to connect together the tabs engaged by said contactor elements so as to short-circuit said elements, all six of the contact members having respective conductive leads connected thereto for connecting the switch into a control system.

10. A safety switching system for preventing serious misalignment of first, second and third control pedals, each of which is adjustable in position by an electrical drive system comprising at least one reversible electrically operable motor having a rotary shaft and first, second and third mechanical conversion devices for converting the rotary motion of the shaft into back and forth movement of the first, second and third pedals, said safety switching system comprising first, second and third slide switches, each of first and second slide switches comprising an electrically insulating support, first, second and third elongated electrically conductive contact members mounted on said support, an electrically conductive common contact mounted on said support and generally parallel with said contact members, a movable bridging contactor, means for supporting said bridging contactor for movement along said contact members and said common contact, said bridging contactor having contactor elements for slidably engaging said contact members and said common contact, said first, second and third contact members having respective sets of equally spaced contact tabs extending therefrom for slid able engagement by the respective first, second, and third slid able contactor elements, said first, second and third sets of contact tabs being offset equally along the length of said contact members, a power supply circuit including a pair of input terminals for receiving electrical power from a suitable source, a reversible electrical control switch connected in the power supply circuit between said input terminals and said motor for supplying electrical power of reversible polarity to said motor for selectively causing operation of said motor in opposite directions of rotation, means for connecting said common contacts of said first and second slide switches in series with said power supply circuit, said third slide switch comprising a third electrically insulating support, seventh, eighth, ninth, tenth, eleventh and twelveth strip-like contact members mounted on said third insulating support and constituting six additional strip-like contact members which are generally parallel with one another, said seventh, eighth, and ninth contact members having respective seventh, eighth and ninth sets of contact tabs projecting laterally from said seventh, eighth and ninth contact members and spaced apart from one another at approximately equal intervals between center of said last-mentioned tabs and along said seventh, eighth and ninth contact members, and being offset successively from one another by a distance corresponding to approximately one-third of the spacing between the successive tabs, said tenth, eleventh and twelveth contact members having corresponding tenth, eleventh and twelveth sets of contact tabs projecting laterally from the respective tenth, eleventh and twelfth contact members and being spaced apart at approximately equal intervals along said tenth, eleventh and twelfth contact members, said tenth, eleventh and twelveth sets of contact tabs being offset successively along the corresponding contact members by approximately one-third of the spacing distance between centers of the corresponding tabs, a third electrically insulating carriage moveable longitudinally along said insulating support generally parallel with all of the six contact members on said support, a third electrically conductive bridging contactor mounted on said carriage and extending generally perpendicular to said contact members of said third slide switch, said third contactor having a set of six contactor elements for conductively engaging the respective six sets of contact tabs on the corresponding six contact members of said third slide switch, said last-mentioned contactor elements being effective to connect together the tabs engaged by said last-mentioned contactor elements so as to short circuit said last-mentioned contactor elements, said power supply circuit comprising a first set of three conductors connected between the contact members of said first slide switch and said seventh, eighth and ninth contact members of said third slide switch, said power supply circuit having a second group of three conductors connected between said contact members of said second slide switch and said tenth, eleventh and twelfth contact members of said third slide switch.

* * * * *